(12) United States Patent
Robert et al.

(10) Patent No.: US 8,565,671 B2
(45) Date of Patent: Oct. 22, 2013

(54) REPEATER FOR RADIO FREQUENCY SIGNALS, AND FOR DIGITAL TELEVISION SIGNALS IN PARTICULAR

(75) Inventors: Jean-Luc Robert, Betton (FR); Jean-Yves Le Naour, Pace (FR); Philippe Minard, Saint Medard sur Ille (FR)

(73) Assignee: Thomson Licensing, Boulogne-Billancourt (FR)

( * ) Notice: Subject to any disclaimer, the term of this patent is extended or adjusted under 35 U.S.C. 154(b) by 810 days.

(21) Appl. No.: 12/452,339

(22) PCT Filed: Jun. 19, 2008

(86) PCT No.: PCT/EP2008/057788
§ 371 (c)(1),
(2), (4) Date: Jun. 4, 2010

(87) PCT Pub. No.: WO2009/003845
PCT Pub. Date: Jan. 8, 2009

(65) Prior Publication Data
US 2010/0240301 A1      Sep. 23, 2010

(30) Foreign Application Priority Data
Jun. 29, 2007   (FR) ..................................... 07 56158

(51) Int. Cl.
*H04B 7/14*      (2006.01)
(52) U.S. Cl.
USPC ............... 455/7; 455/213; 455/307; 455/311; 455/339; 455/127.3

(58) Field of Classification Search
None
See application file for complete search history.

(56) References Cited

U.S. PATENT DOCUMENTS

| | | | |
|---|---|---|---|
| 6,560,297 B1 * | 5/2003 | Broughton | 375/308 |
| 7,043,203 B2 * | 5/2006 | Miquel et al. | 455/24 |
| 7,809,047 B2 * | 10/2010 | Kummetz | 375/211 |

FOREIGN PATENT DOCUMENTS

| | | |
|---|---|---|
| EP | 1261148 | 11/2002 |
| EP | 1708374 | 10/2006 |
| GB | 2306082 | 4/1997 |

OTHER PUBLICATIONS

Search Report Dated Dec. 8, 2008.

* cited by examiner

*Primary Examiner* — Yuwen Pan
*Assistant Examiner* — Fanghwa Wang
(74) *Attorney, Agent, or Firm* — Tutunjian & Bitetto, P.C.

(57) ABSTRACT

This invention concerns a repeater for radio frequency signals having a channel filter and an active filter connected to the channel filter output. The active filter covers the channels adjacent to the channel filter and includes an amplifier and; two bandpass filters in parallel connected as a negative feedback loop around the amplifier. The first bandpass filter covers the lower adjacent channels and the second bandpass filter covers the higher adjacent channels. The invention notably applies to the development of domestic repeaters for mobile terminals meeting the DVB-H digital television standard.

8 Claims, 6 Drawing Sheets

Figure 1:
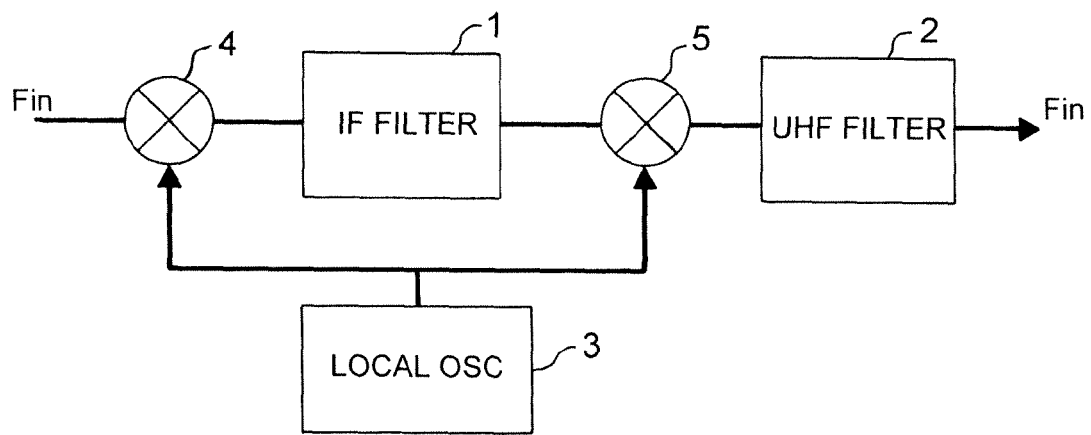

REPEATER FOR RADIO FREQUENCY SIGNALS, AND FOR DIGITAL TELEVISION SIGNALS IN PARTICULAR

This application claims the benefit, under 35 U.S.C. §365 of International Application PCT/EP2008/057788, filed Jun. 19, 2008, which was published in accordance with PCT Article 21(2) on Jan. 8, 2009 in English and which claims the benefit of French patent application No. 0756158, filed Jun. 29, 2007.

This invention concerns a repeater for radio frequency signals. It notably applies to the development of domestic repeaters for mobile terminals meeting the DVB-H digital television standard.

Have benefited from the experience of 2G and 3G terminals, users can expect to obtain good reception of DVB-H mobile television services irrespective of their location. In particular, this location may be in a home—in an apartment for example—or in a car. The stringent requirements associated with this type of transmission have led companies to consider solutions providing this expected service quality.

One of the options considered is to increase the density of the current transmission network by adding small, low-power re-transmitters which can be installed independently inside homes or vehicles. Studies have been carried out into the feasibility of such a solution.

One scenario considered uses the re-transmission of DVB-H signals in iso frequency mode, in other words the repeater output frequency equals the input frequency. As the repeater used is intended to be deployed without a license, particular attention must be given to preventing any interference with analogue or digital programmes operating at frequencies in the vicinity of the repeater's reception channel. The aim of such a repeater is thus in particular to select a single DVB-H channel and re-transmit at higher power while ensuring very high selectivity, in other words providing effective protection against interference with adjacent channels.

To meet these technical criteria, a transmission mask has been defined by a SGF-TF working group (DVB-H Small Gap Fillers Task Force) for a nominal transmission power of 0 dBm. Several architectures have been proposed by this working group. None of these solutions provides sufficient rejection outside the channel to prevent interference in the adjacent channels. Other proposed solutions are too complex to implement.

One of the aims of the invention is to allow the development of a repeater having a simple architecture while providing good filtering outside the reception band. For this purpose, the scope of the invention is a repeater for the transmission of a radio frequency signal, at least including:
  a channel filter;
  an active filter connected to the channel filter output, covering the channels adjacent to the channel filter.

In an implementation method, the active filter at least includes:
  an amplifier the output of which forms the output of the said filter;
  two bandpass filters in parallel connected as a negative feedback loop around the amplifier, a first bandpass filter covering the lower adjacent channels and a second bandpass filter covering the higher adjacent channels.

As the channel is an N order channel, the first filter covers for example the lower adjacent channels N−1 to N−3 and the second filter covers for example higher adjacent channels N+1 to N+3.

The repeater also includes for example:
  a circuit converting the radio frequency signal into an intermediate frequency, with the channel filter filtering the signal converted into an intermediate frequency;
  a circuit converting the signal into an intermediate frequency at its original frequency, downstream of the active filter.

The circuit converting the signal to intermediate frequency for example includes a local oscillator delivering the intermediate frequency and a mixer, with the local oscillator output connected to a mixer input, and the other mixer input receiving the radio frequency signal, with the mixer output connected to the channel filter input.

The circuit converting the intermediate frequency into the original frequency for example includes a local oscillator delivering the intermediate frequency and a mixer, with the local oscillator output connected to a mixer input, and the other mixer input connected to the active filter output.

The repeater includes for example a variable gain amplifier upstream of the channel filter and a variable gain amplifier downstream of the active filter. The channel filter is for example a surface acoustic wave filter.

An advantage is that the repeater can receive digital television signals.

Figure 2:
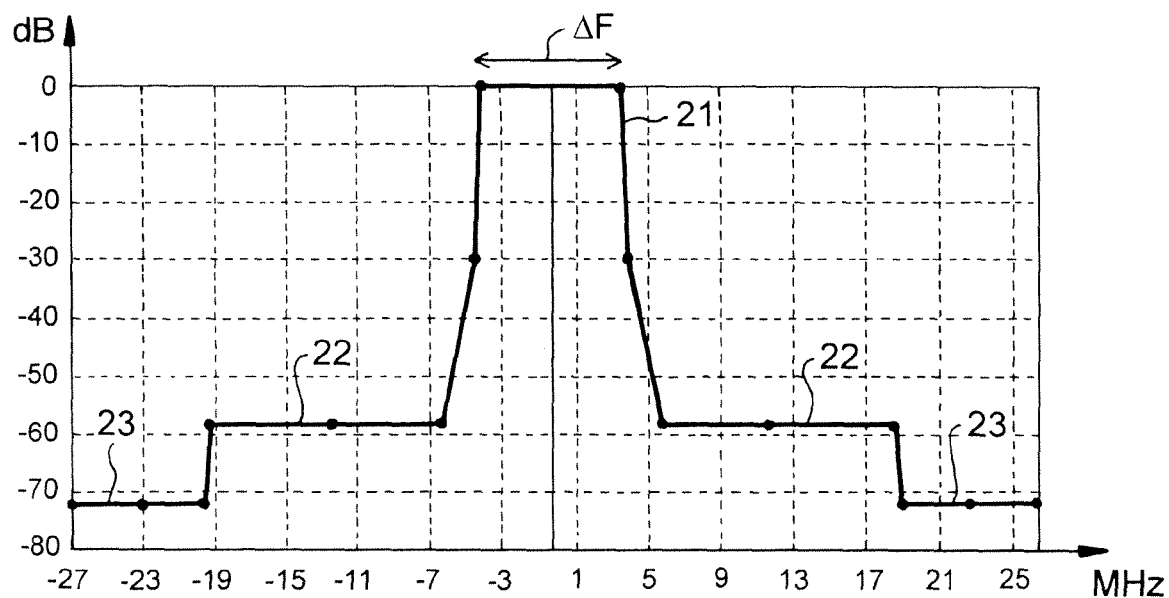
Figure 3:
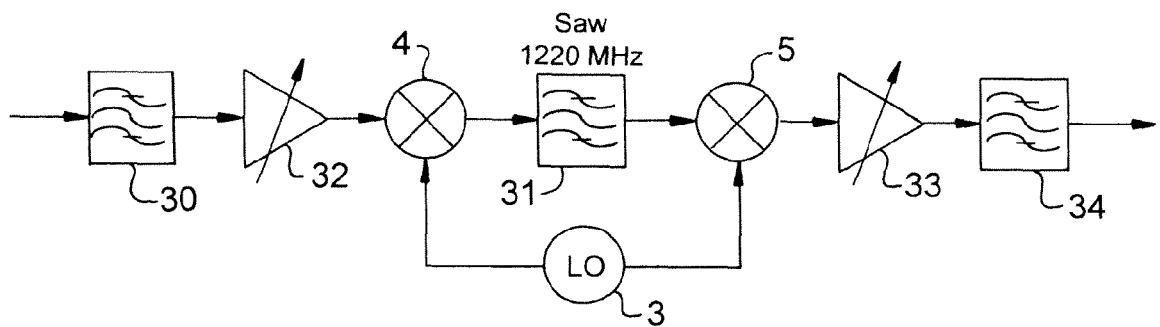
Figure 4:
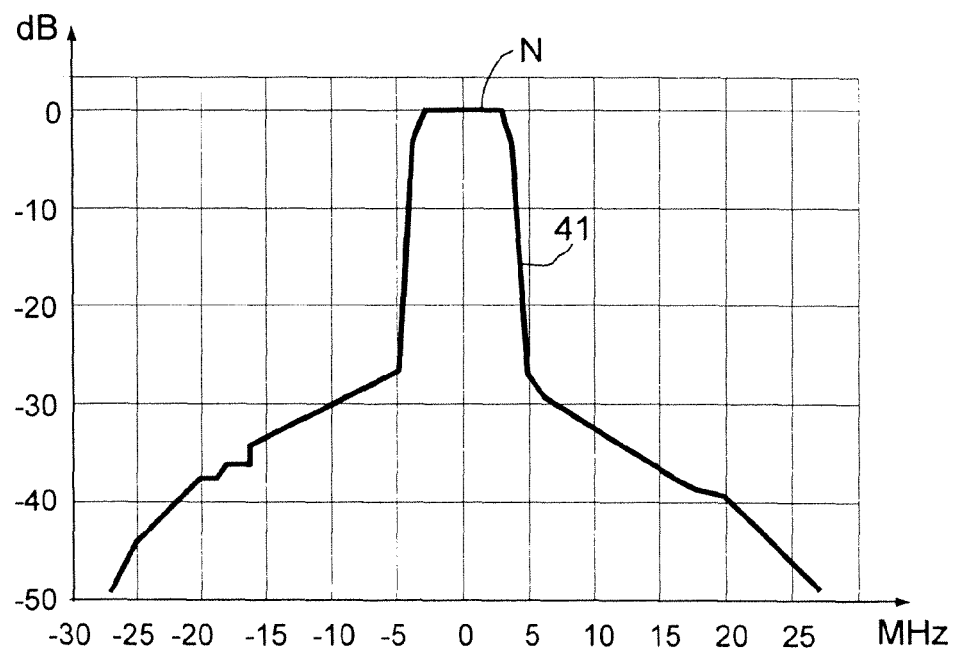
Figure 5:
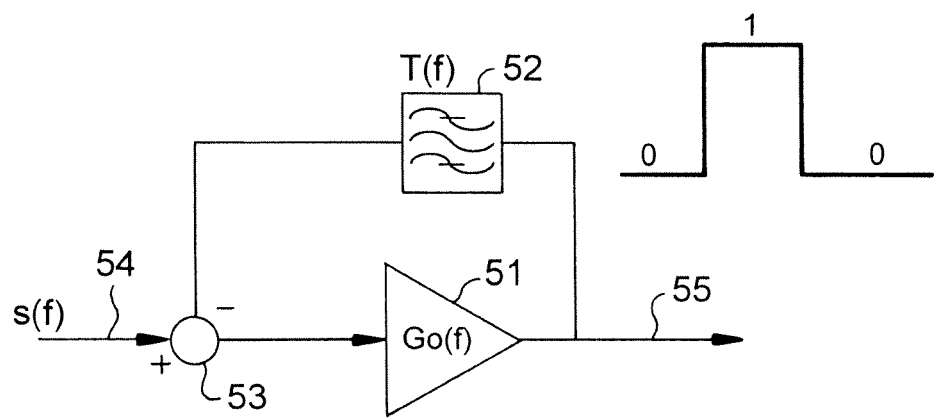
Figure 6A:
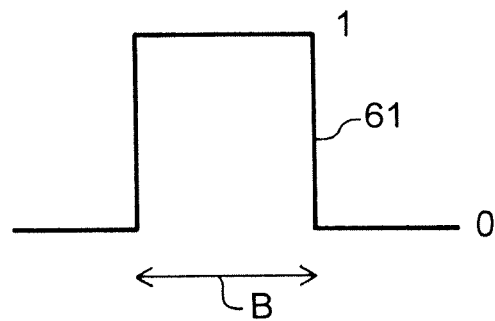
Figure 6B:
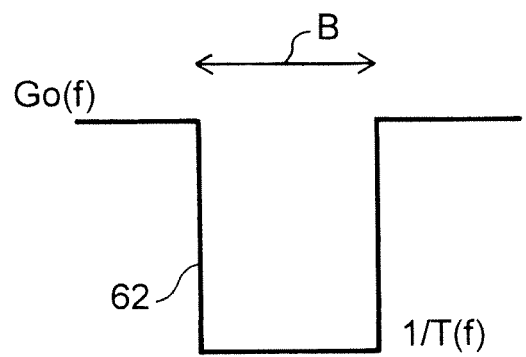
Figure 7:
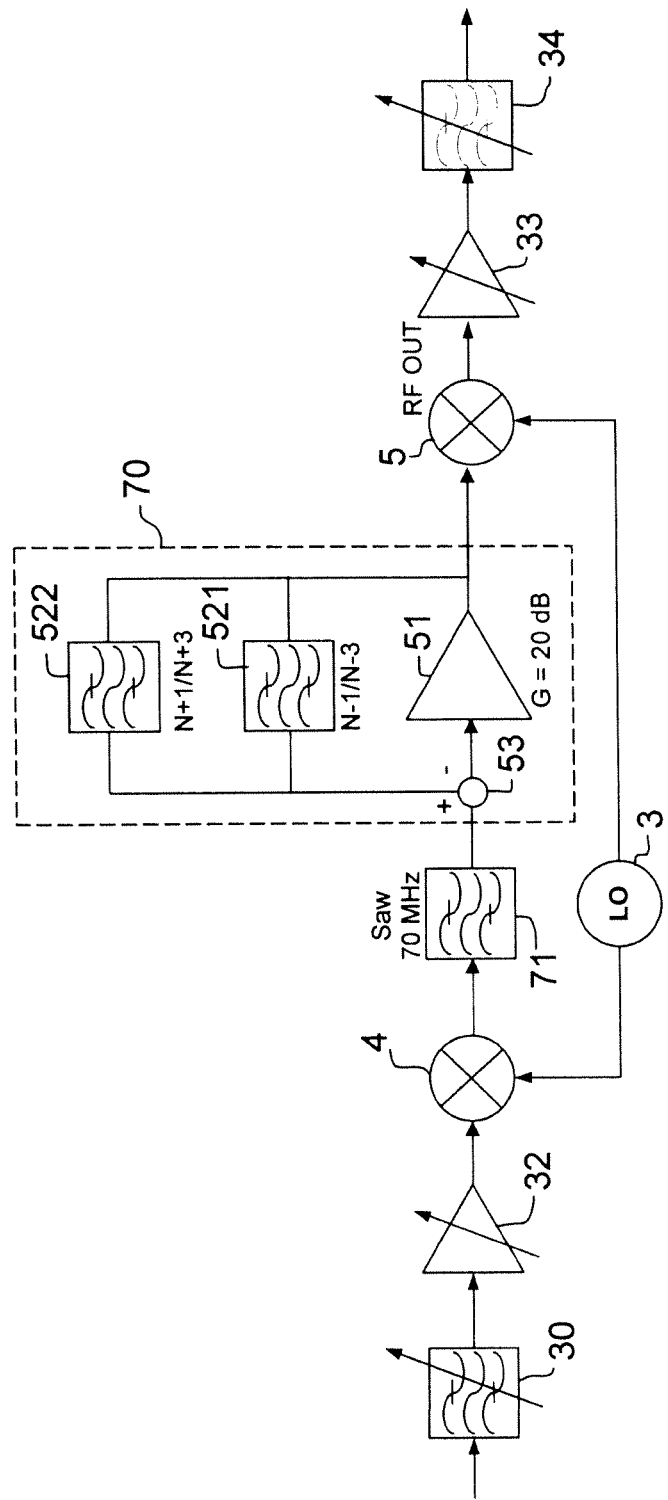
Figure 8A:
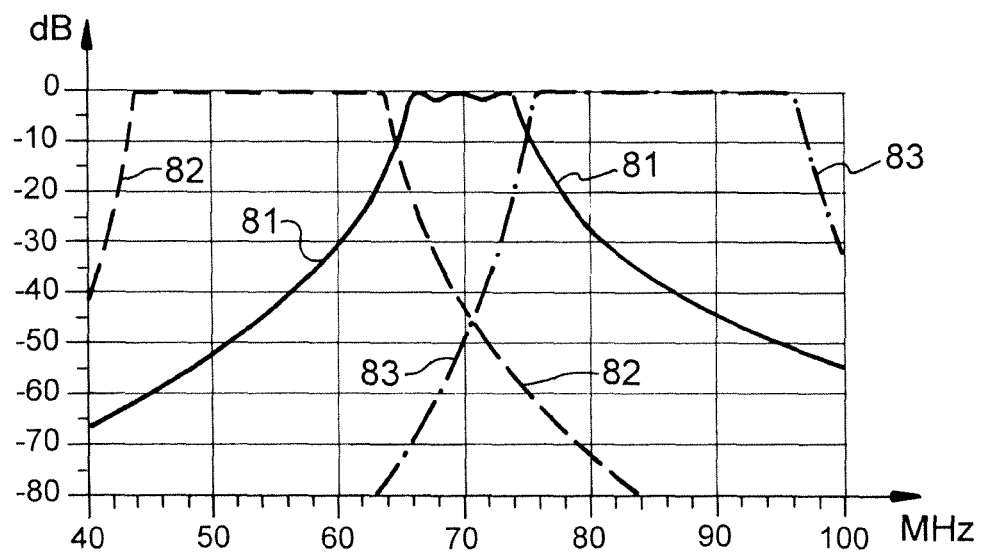
Figure 8B:
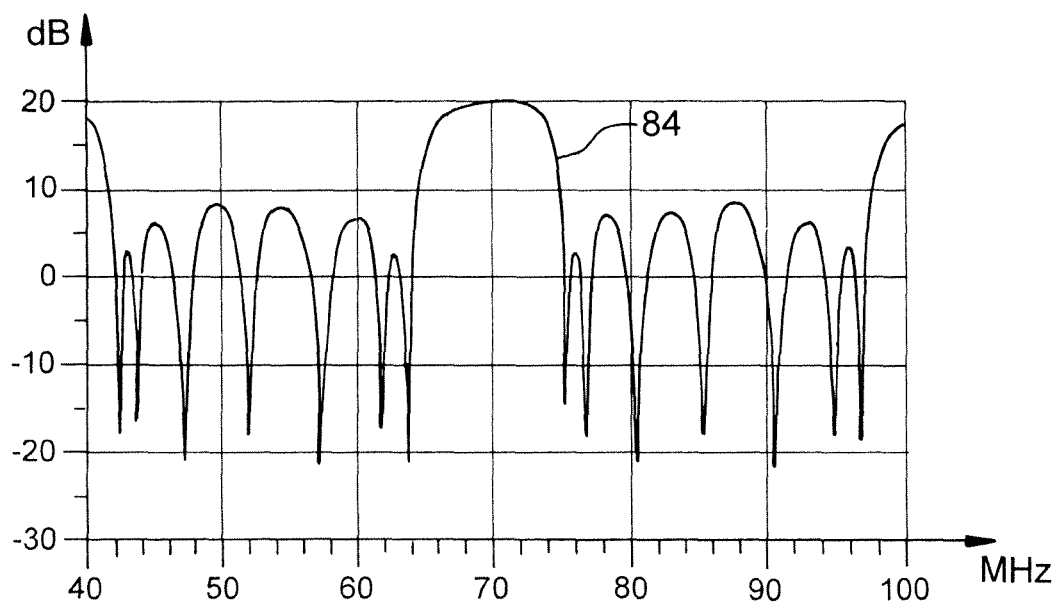
Figure 9A:
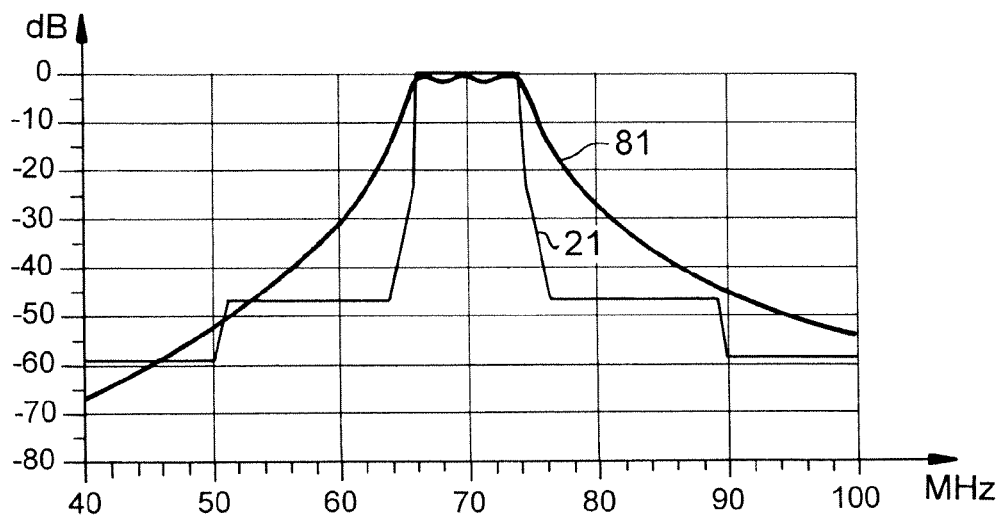
Figure 9B:
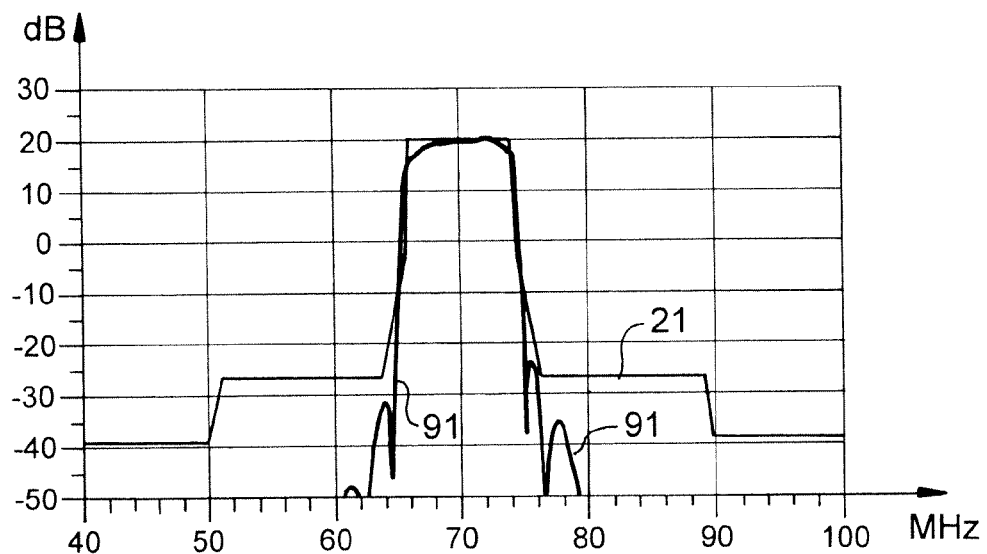
Figure 10:
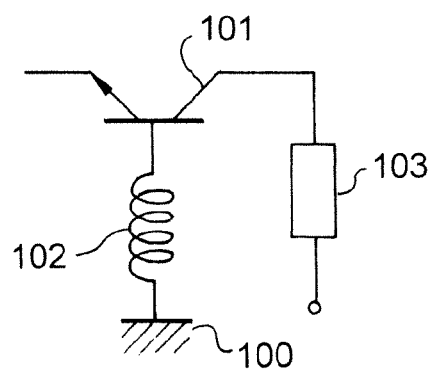

Other characteristics and advantages of the invention are highlighted through the following description given opposite appended drawings representing:
  FIG. 1, an example of the basic structure of a repeater;
  FIG. 2, an example of a transmission mask providing effective protection against interference between adjacent transmission channels;
  FIG. 3, an example of the structure of the repeater with simple conversion into intermediate frequency;
  FIG. 4, an illustration of the response of a surface acoustic wave channel filter;
  FIG. 5, a presentation of the schematic diagram of an active filter equipping the repeater in the present invention;
  FIGS. 6a and 6b, the respective illustrations of the response of an ideal bandpass filter and the response of the previous active filter incorporating this ideal filter;
  FIG. 7, an example of a repeater developed in the present invention;
  FIGS. 8a and 8b, the respective illustrations of the responses of a channel filter and bandpass filters of adjacent channels and the response of the active filter;
  FIGS. 9a and 9b, showing the channel filter and the transmission mask without a filter and with an active filter respectively;
  FIG. 10, an example of the development of a bipolar transistor based active resonator connected in a negative resistance configuration.

FIG. 1 shows an example of the basic structure of a repeater, which is also still known as a "gap filler". It includes an intermediate frequency bandpass filter 1, a UHF filter 2 and a local oscillator 3. It also includes at the input a first radio frequency mixer 4 one input of which receives the signal at the frequency Fin with the other input being connected to the local oscillator. The mixer output, connected to the input of the intermediate frequency filter 1, delivers the input signal converted to intermediate frequency. The output of this filter 1 is connected to the input of a second mixer 5 the other input of which is connected to the local oscillator 3. The output of the mixer 5, connected to the input of the UHF filter 2, delivers a signal at the original frequency Fin again. As indicated previously, the aim of this repeater is to select a single DVB-H channel and re-transmit at higher power, with a high level of selectivity to prevent interference with adjacent channels.

Curve 21 in FIG. 2 illustrates the aforementioned transmission mask meeting the required selectivity criteria, for a transmission power of 0 dBm. In the graph, the Y-axis represents the filter attenuation in dBm and the X-axis represents the frequency in MHz. The filter is symmetrically centered on the channel central frequency which is by convention taken to be equal to 0. The filter of width ΔF has steep sides which are then flared slightly to a first level 22 and then to a second level 23.

FIG. 3 shows an example of the structure of the repeater with simple conversion into a high intermediate frequency. The structure reuses the structure of the repeater in FIG. 1. The signal at the input of the first mixer 4 is fed from a variable gain amplifier 32. Before being amplified by this amplifier, the radio frequency signal received is for example filtered by a filter 30. The signal at the output of the second mixer is fed to another variable gain amplifier 33 before being fed through a UHF filter 34.

In this type of structure, the desired channel is converted into a high intermediate frequency, for example 1220 MHz, and then filtered by a fixed surface acoustic wave (SAW) bandpass filter 31, for example. The signal is then converted back into its original frequency as indicated previously in FIG. 1. Due to the high frequency of the SAW filter, however, it does not provide sufficient filtering of the adjacent channels.

The conversion into a high intermediate frequency can be replaced by a conversion into a low intermediate frequency. In this solution, the input signal is thus converted into a low intermediate frequency and then filtered by an SAW filter operating at low frequency, for example 36 MHz. After filtering, the signal is converted back into its original frequency. A difference from the previous case is that the image frequency at the output of the second mixer drops to the UHF band. The latter can, however, be filtered by a tunable filter before being converted downwards at the input of the first mixer. A tunable filter is also required at the output to limit any undesirable signals at the frequency of the local oscillator or at the frequencies of side bands. This solution, in spite of the SAW filter's better filtering at low frequency, does not provide sufficient filtering in channels adjacent to an N channel, in particular in channels N−3 to N−1 and N+1 to N+3.

A double (high and low) conversion structure, combining the two previous structures is possible, notably using at least two local oscillators, four mixers and four SAW filters. It is more complex to implement but does provide better selectivity.

These structure examples either do not provide sufficient selectivity, or if they do, as in the case with double conversion, they are too complicated to implement, in particular for a device which is only supposed to be an accessory to improve reception in homes or vehicles.

The solution proposed by the invention in particular make it possible to limit the architecture to a simple arrangement needing only one SAW filter at intermediate frequency while providing the required filtering criteria outside the band, in accordance, for example, with the transmission mask in FIG. 2. It has the advantages of being compatible with the simple high or low frequency conversion solutions described previously.

The curve 41 in FIG. 4 illustrates the form of the attenuation provided by an SAW filter in a graph similar to that of FIG. 2. One problem arises in particular from the response of SAW type filters which generally provide an attenuation of about 40 dB in the band immediately adjacent to the N channel and neighbouring side attenuations of about 50 dB. These attenuations are insufficient, in particular to effectively cover the adjacent channels N−3 to N−1 and N+1 to N+3.

FIG. 5 presents a schematic diagram of an active filter fitted to a repeater in the present invention, with this active filter filtering the channels adjacent to the N channel. The filter in FIG. 5 includes an amplifier 51, with a gain $G_0(f)$ depending on the frequency, and a bandpass filter 52 having a response $T(f)$ depending on the frequency. This filter 52 is connected in the negative-feedback loop of the amplifier 51. The filter 52 is thus connected on the one hand to the amplifier output 51 and on the other to the negative input of an adder 53, with the adder positive input receiving the signal s(f). The adder output, connected to the amplifier input, delivers a signal s(f)−s'(f), where s'(f) is the signal at the output of the filter 52. The gain G(f) between the input 54 and the output 55 of the active filter in FIG. 5 is expressed by the following equation:

$$G(f) = \frac{G_0(f)}{1 + T(f) \cdot G_0(f)} \quad (1)$$

An ideal bandpass filter has a gain within the band of 1, or 0 dB, without insertion loss and a gain outside the band of 0. In other words it provides a high level of attenuation.

If moreover the gain $G_0(f)$ of the amplifier is much greater than 1, i.e. in excess of 1, $G_0(f) \gg 1$, the following is obtained for an ideal filter:
 in the filter band, where T(f)=1, T(f). $G_0(f) \gg 1$, i.e. G(f) =1/T(f);
 outside the filter band, where T(f)=0, T(f). $G_0(f)$ significantly equal to 0, i.e. G(f)=$G_0(f)$.

In an ideal case, the active filter in FIG. 5 has a response which has the reverse shape to that of the bandpass filter 52.

FIGS. 6a and 6b illustrate these reverse shapes. Curve 61 in FIG. 6a represents the shape of the filtering response, with the gain equal to 1 in band B and equal to 0 outside the band. Curve 62 in FIG. 6b illustrates the shape of the response of the active filter, the attenuation being equal to 1/T(f) in the band B and equal to $G_0(f)$ outside the band.

FIG. 7 presents an example of a repeater developed in the present invention. In this implementation method, based on the simple conversion arrangement of FIG. 3, the filtering of the N channel is always carried out by an SAW filter 71, for example at 70 MHz. It is followed by an active filter 70 of the type shown in FIG. 5. In this case, the active filter consists of the amplifier 51 associated with two bandpass filters 521, 522 in parallel connected in a negative-feedback loop around the amplifier 51 as described in relation to FIG. 5. A first filter 521 covers for example the lower adjacent channels N−1 to N−3, with its bandwidth corresponding to the frequencies of channels N−1 to N−3, and a second filter 522 covers for example the higher adjacent channels N+1 to N+3, with its bandwidth corresponding to the frequencies of channels N+1 to N+3. The active filter output, which is in fact the output of amplifier 51, is connected to the input of the second mixer 5.

Curve 81 in FIG. 8A illustrates the response of the channel filter 71 in a graph of frequencies in MHz plotted against attenuations in dB. In the case of the previous implementation example, the response is centered on the frequency 70 MHz. It presents a low attenuation outside the channel. Two other curves 82, 83 located on either side of the first curve 81, respectively illustrate the theoretical responses T(f) of the two bandpass filters 521, 522 covering the lower and upper adjacent channels. When these bandpass filters are connected in a negative-feedback loop around the amplifier 51 of the active filter 70, the later has a response illustrated by curve 84 in FIG. 8b in the same graph as that of FIG. 8a. This response 84 has a reverse shape compared with the responses 82, 83 of the two bandpass filters as illustrated in FIG. 8a.

FIGS. 9a and 9b, respectively show the channel filter and the transmission mask without and with an active filter. In the same graph as previously, curve 81 in FIG. 9a represents the response of the channel filter opposite curve 21 which represents of the desired transmission mask. This figure shows that the channel filter does not meet the requirements of the mask 21, as its response is not located within this mask. Curve 91 in FIG. 9 represents the response with the active filter 70 still compared with mask 21. This figure shows that the filtering obtained in a repeater in the present invention provides better compliance of the mask 21 in the channel band and significantly improves the filtering outside the band.

If the adjacent filters are not available on the market in SAW technology, they may be produced in surface-mounted component (SMC) technology. Simulations carried out by the applicant have shown that a filter structure of the Tchebychev type with seven poles may be advantageously used.

In the frequency ranges involved, the quality of passive components such as inductors or capacitors may be mediocre. An active filter may be implemented using active resonators. An active resonator may be based on a single bipolar transistor connected in a negative resistance configuration as illustrated in FIG. 10. In this configuration, an NPN bipolar transistor 101 is for example used. An inductor 102 is connected between the transistor base and a reference potential 100. The transistor is biased by a resistor 103 connected to its collector. Active inductive resonators based on a single bipolar transistor mounted in common base configuration can be produced as illustrated in FIG. 10. In this case, the bipolar transistor has an inductive input impedance when seen from the emitter and the resonator without loss is then produced by adding a capacitor in parallel with the transistor. The main advantage of active resonators is their compact size and their high quality factor.

A possible implementation solution based on these active resonators can then be based on a known integration of Silicon In Package (SIP) type comprising two bandpass filters 521, 522 on high resistivity silicon. The repeater's complete filter, including the channel filter, can be advantageously integrated. The inductors used 102 are for example of the spiral inductor type adapted for integration on silicon. Resonator capacitors are for example produced from silicon varactors providing a very good quality factor at the frequencies involved. The transistors 101 can be mounted on a chip. For the complete implementation of the filter, the amplifier 51, of the differential input type, for example, can also be integrated in a chip and connected to the filtering components by "bonding" type wire connections. Such an implementation mode provides the active filtering function 70 with both the required performance criteria and miniaturisation.

An active filtering device in the present invention notably provides domestic repeaters adapted for mobile terminals meeting the DVB-H standard with a relatively simple architecture based on a simple intermediate frequency conversion.

The invention claimed is:

1. A repeater for transmitting digital television signals, comprising:
    a channel filter;
    a first intermediate frequency conversion circuit converting a radio frequency signal into an intermediate frequency, with the channel filter filtering the signal converted into the intermediate frequency;
    an active filter connected to the channel filter output, covering the channels adjacent to the channel filter,
    the active filter comprising:
        an amplifier having an output which forms an output signal of the said active filter; and
        two bandpass filters in parallel connected as a negative feedback loop around the amplifier, a first bandpass filter covering the lower adjacent channels and a second bandpass filter covering the higher adjacent channels; and
    a second intermediate frequency conversion circuit, converting the output signal of the said active filter into an intermediate frequency at an original frequency of the radio frequency signal, downstream of the active filter, being fed through a UHF filter.

2. The repeater according to claim 1, wherein the channel is an N order channel, and wherein a first of said two bandpass filters covers the lower adjacent channels N−1 to N−3 and a second of said two bandpass filter covers the higher adjacent channels N+1 to N+3.

3. The repeater according to claim 1, wherein the first intermediate frequency conversion circuit comprises a local oscillator and a mixer, with the local oscillator output connected to a mixer input, and the other mixer input receiving the radio frequency signal, with the mixer output connected to the channel filter input.

4. The repeater according to claim 1, wherein the second intermediate frequency conversion circuit converting the intermediate frequency into the original frequency of the radio frequency signal comprises a local oscillator and a mixer, with the local oscillator output connected to a mixer input, and the other mixer input connected to the active filter output.

5. The repeater according to claim 1, further comprising a variable gain amplifier, upstream of the channel filter.

6. The repeater according to claim 1, further comprising a variable gain amplifier, downstream of the active filter.

7. The repeater according to claim 1, wherein the channel filter is a surface acoustic wave filter.

8. The repeater according to claim 1, wherein it receives digital television signals.

* * * * *